(12) United States Patent
Kim (10) Patent No.: US 7,694,922 B2
(45) Date of Patent: Apr. 13, 2010

(54) SUPPORTING APPARATUS FOR DISPLAY DEVICES AND DISPLAY DEVICE HAVING THE SAME

(75) Inventor: Young Tai Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 201 days.

(21) Appl. No.: 11/826,173

(22) Filed: Jul. 12, 2007

(65) Prior Publication Data

US 2008/0035802 A1 Feb. 14, 2008

(30) Foreign Application Priority Data

| Aug. 10, 2006 | (KR) | ...................... 10-2006-0075884 |
| Aug. 10, 2006 | (KR) | ...................... 10-2006-0075885 |
| Aug. 10, 2006 | (KR) | ...................... 10-2006-0075886 |
| Nov. 21, 2006 | (KR) | ...................... 10-2006-0115311 |

(51) Int. Cl.
*F16M 11/00* (2006.01)

(52) U.S. Cl. ............. 248/176.1; 248/291.1; 248/292.13; 248/917; 248/919; 248/922; 248/923

(58) Field of Classification Search ......... 248/917–923, 248/176.1, 291.1, 292.13; 361/680
See application file for complete search history.

(56) References Cited

U.S. PATENT DOCUMENTS

| 3,845,928 | A | * | 11/1974 | Barrett et al. ........... 248/292.13 |
| 5,108,062 | A | * | 4/1992 | Detwiler ................... 248/185.1 |
| 5,652,694 | A | * | 7/1997 | Martin .................... 361/679.09 |
| 5,765,794 | A | * | 6/1998 | Chen ....................... 248/292.12 |
| 6,532,628 | B2 | * | 3/2003 | Kim ............................. 16/342 |
| 6,772,983 | B1 | * | 8/2004 | Liao et al. ................. 248/291.1 |
| 7,178,201 | B2 | * | 2/2007 | Lee et al. ....................... 16/342 |
| 2003/0042385 | A1 | | 3/2003 | Hung et al. |
| 2003/0056332 | A1 | | 3/2003 | Coburn |
| 2004/0084585 | A1 | | 5/2004 | Watanabe et al. |
| 2005/0092873 | A1 | | 5/2005 | Lin |

FOREIGN PATENT DOCUMENTS

| DE | 10213356 | 9/2003 |
| EP | 1113213 | 7/2001 |
| KR | 10-2006-74206 | 7/2006 |

OTHER PUBLICATIONS

European Search Report, dated May 12, 2009, issued in corresponding European Application No. 7111119.9.

* cited by examiner

*Primary Examiner*—Amy J Sterling (57) ABSTRACT

Provided are a supporting apparatus for display devices and a display device having the same, which make it possible to simplify construction, compared to the conventional ones, to provide easier production and to reduce production costs, as well as to maintain uniform motion of a main body of the display device when adjusting a viewing angle of a display screen of the main body. The supporting apparatus for display devices includes a supporting bracket provided to a main body of the display device, a base supporting the main body, a stand coupled to the base at a lower portion thereof and to the supporting bracket at an upper portion thereof, and a joint rotatably connecting the upper portion of the stand and the supporting bracket. Here, the joint includes a curved plug that is provided at the upper portion of the stand and has a curved outer surface, a curved socket that is formed at the supporting bracket so as to be coupled with the curved plug, and an elastic member that is interposed and connected between the curved plug and the curved socket.

12 Claims, 11 Drawing Sheets

SUPPORTING APPARATUS FOR DISPLAY DEVICES AND DISPLAY DEVICE HAVING THE SAME

CROSS-REFERENCE TO RELATED APPLICATIONS

This application claims the benefit of Korean Patent Application Nos. 10-2006-0075884, 10-2006-0075885, 10-2006-0075886, and 10-2006-0115311, filed on August 10, August 10, August 10, and Nov. 21, 2006, respectively, in the Korean Intellectual Property Office, the disclosures of which are incorporated herein by reference.

BACKGROUND OF THE INVENTION

1. Field of the Invention

The present invention relates generally to a supporting apparatus for display devices, and more particularly to a supporting apparatus for display devices, capable of supporting a main body and adjusting the viewing angle of a display screen of the main body, and a display device having the same.

2. Description of the Related Art

A display device such as a liquid crystal display (LCD) or a plasma display panel (PDP) is provided with a supporting apparatus, which supports a main body and simultaneously adjusts the viewing angle of a display screen of the main body so as to use it on a table such as a desk. Such a supporting apparatus for display devices is disclosed in Korean Patent Application Publication No. 2006-74206 (Jul. 3, 2006).

The supporting apparatus for display devices disclosed in the document includes a pivot bracket that is coupled to the rear surface of a monitor main body, a stand that is rotatably coupled to the pivot bracket by a monitor hinge at an upper portion thereof and to a base by a base hinge at a lower portion thereof, and a link bar that allows an angle of the monitor main body to be constantly maintained when the angle of the monitor main body is adjusted by rotating the stand. The stand and the link bar are coupled on the side of the pivot bracket by a hinge shaft of the monitor hinge at upper ends thereof, and on the side of the base by a hinge shaft of the base hinge at upper ends thereof.

However, this supporting apparatus for display devices is complicated and thus has difficulty in production because the upper end of the stand is coupled to the monitor main body by the hinge shaft, and because the lower end of the stand is coupled to the base by the hinge shaft. Further, because the hinge shaft coupled to each coupled portion is expensive, the supporting apparatus has high production costs.

Further, this supporting apparatus for display devices is unstable in motion because a moment of rotational, i.e. torque is varied as the center of gravity of the monitor main body moves backwards and forwards when the angle of the monitor main body is adjusted by rotating the stand, but the coupled force on the side of the hinge shaft is constantly maintained.

SUMMARY OF THE INVENTION

The present invention solves the above-mentioned problems occurring in the prior art, and provides a supporting apparatus for display devices and a display devices having the same, which make it possible to simplify construction, compared to the conventional display devices, to provide easier production, and to reduce production costs.

According to an aspect of the present invention, there is provided a supporting apparatus for display devices and a display devices having the same, which make it possible to maintain uniform motion of a main body of the display device when adjusting the viewing angle of a display screen of the main body, and thus to easily adjust the viewing angle of the display screen.

According to an aspect of the present invention, there is provided there is provided a supporting apparatus for display devices, which includes a supporting bracket provided to a main body of the display device, a base to support the main body, a stand coupled to the base at a lower portion thereof and to the supporting bracket at an upper portion thereof, and a joint to rotatably connect the upper portion of the stand and the supporting bracket. The joint may include a curved plug that is provided at the upper portion of the stand and has a curved outer surface, a curved socket that is formed at the supporting bracket so as to be coupled with the curved plug, and an elastic member that is interposed and connected between the curved plug and the curved socket.

The curved plug may be oval and have a vertical diameter larger than a horizontal diameter, when viewed in cross section.

Further, the curved plug may be cylindrical and be integrally formed with the stand.

Also, the elastic member may have the shape of a cap, and include an inner contact surface corresponding to the outer surface of the curved plug, and an outer contact surface corresponding to an inner surface of the curved socket.

Further, the inner contact surface of the elastic member may have a horizontal width, of its opening, less than the horizontal diameter of the curved plug, and have a vertical depth greater than a vertical radius of the curved plug.

In addition, the outer surface of the elastic member and the inner surface of the curved socket may each be provided with a corrugation having a convexity and a concavity.

Further, the supporting apparatus may further include a rotation stopper provided to the curved plug and the supporting bracket so as to restrict a rotational range within which the main body rotates backwards and forwards.

The rotation stopper may include at least one protrusion that protrudes from the upper portion of the curved plug, and at least one slot that is formed at the supporting bracket in a rotating direction of the supporting bracket so as to allow the protrusion to be inserted thereinto.

Further, the protrusion may be provided with first and second catch steps at opposite ends thereof; and the slot may be provided with first and second catch recesses so as to catch the first and second catch steps at opposite ends thereof.

The supporting apparatus may further include a reinforcement spring that is covered on an outer surface of the elastic member so as to reinforce the elasticity of the elastic member.

Further, the reinforcement spring may have a "C" shaped spring pressing the outer surface of the elastic member in close contact with the outer surface of the elastic member; and the elastic member may be provided with a spring fitting recess for fitting the reinforcement spring on the outer contact surface thereof.

According to another aspect of the present invention, there is provided a display device, which includes a main body having a display screen, and a supporting apparatus to support the main body. The supporting apparatus may include a supporting bracket provided to the main body, a base to support the main body, a stand coupled to the base at a lower portion thereof and to the supporting bracket at an upper portion thereof, and a joint to rotatably connect the upper portion of the stand and the supporting bracket. The joint may include a curved plug that is provided at the upper portion of the stand and has a curved outer surface, a curved socket that is formed at the supporting bracket so as to be coupled with the curved plug, and an elastic member that is interposed and connected between the curved plug and the curved socket.

According to yet another aspect of the present invention, there is provided a supporting apparatus for display devices, which includes a base to support a main body of the display device, a stand coupled to the base at a lower portion thereof and to the supporting bracket at an upper portion thereof, and a joint to rotatably connect the lower portion of the stand and the base. The joint may include a curved plug that is provided at the lower portion of the stand and has a curved outer surface, a curved socket that is formed at the base so as to be coupled with the curved plug, and an elastic member that is interposed and connected between the curved plug and the curved socket.

The curved plug may be spherical and be integrally formed with the stand. The curved plug may be oval and have a vertical diameter larger than a horizontal diameter, when viewed in cross section.

Further, the inner contact surface of the elastic member may have a horizontal width, of its opening, less than the horizontal diameter of the curved plug, and have a vertical depth greater than a vertical radius of the curved plug.

Also, the upper portion of the stand may be fixed to the main body.

Further, the joint may further include a rotation stopper provided to the curved plug and the supporting bracket so as to restrict a rotational range within which the main body rotates backwards and forwards.

In addition, the rotation stopper may include a protrusion that protrudes from the upper portion of the curved plug, and a slot that is formed at the base in a rotating direction of the curved plug so as to allow the protrusion to be inserted thereinto.

Further, the supporting apparatus may further include a lower cover coupled to the lower portion of the base in order to open and close the lower portion of the curved socket.

According to still yet another aspect of the present invention, there is provided a display device, which includes a main body having a display screen, and a supporting apparatus to support the main body. The supporting apparatus may include a base to support the main body, a stand coupled to the base at a lower portion thereof and to the main body at an upper portion thereof, and a joint to rotatably connect the lower portion of the stand and the base. The joint may include a curved plug that is provided at the lower portion of the stand and has a curved outer surface, a curved socket that is formed at the base so as to be coupled with the curved plug, and an elastic member that is interposed and connected between the curved plug and the curved socket.

According to another aspect of the present invention, there is provided a supporting apparatus for a main body of a display device, the supporting apparatus including a supporting bracket adapted to be coupled to the main body; and a joint to rotatably couple the supporting bracket to a stand. The joint may include a curved plug that is provided at the stand and has a curved outer surface, a curved socket that is formed at the supporting bracket so as to be coupled with the curved plug, and an elastic member that is interposed and connected between the curved plug and the curved socket.

According to another aspect of the present invention, there is provided a supporting apparatus for a display device, the supporting apparatus including a base; a stand coupled to a main body of the display device; and a joint to rotatably couple the stand and the base. The joint may include a curved plug that is provided at the stand and has a curved outer surface, a curved socket that is formed at the base so as to be coupled with the curved plug, and an elastic member that is interposed and connected between the curved plug and the curved socket.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
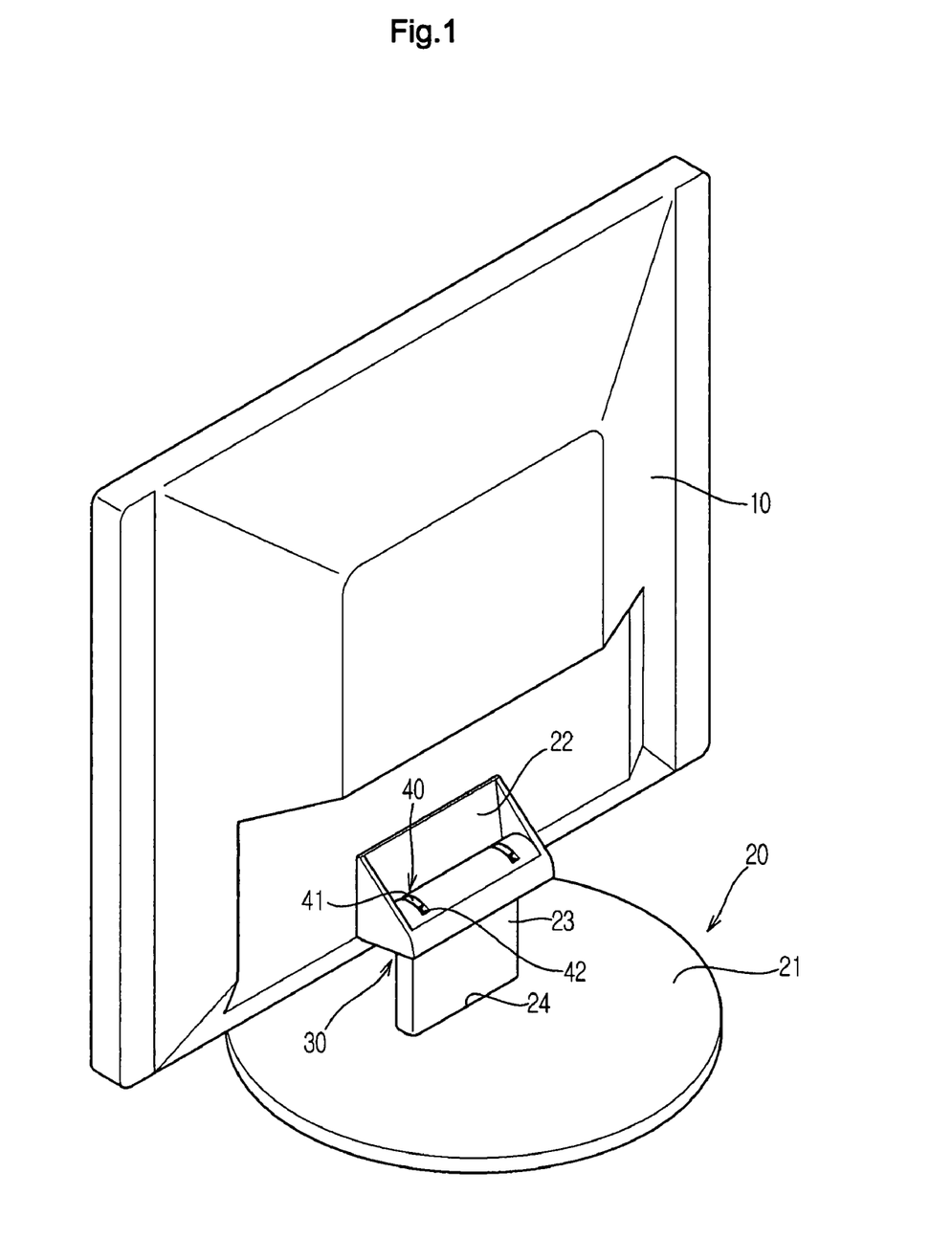
FIG. 1 is a perspective view illustrating a display device according to a first exemplary embodiment of the present invention.
Figure 2:
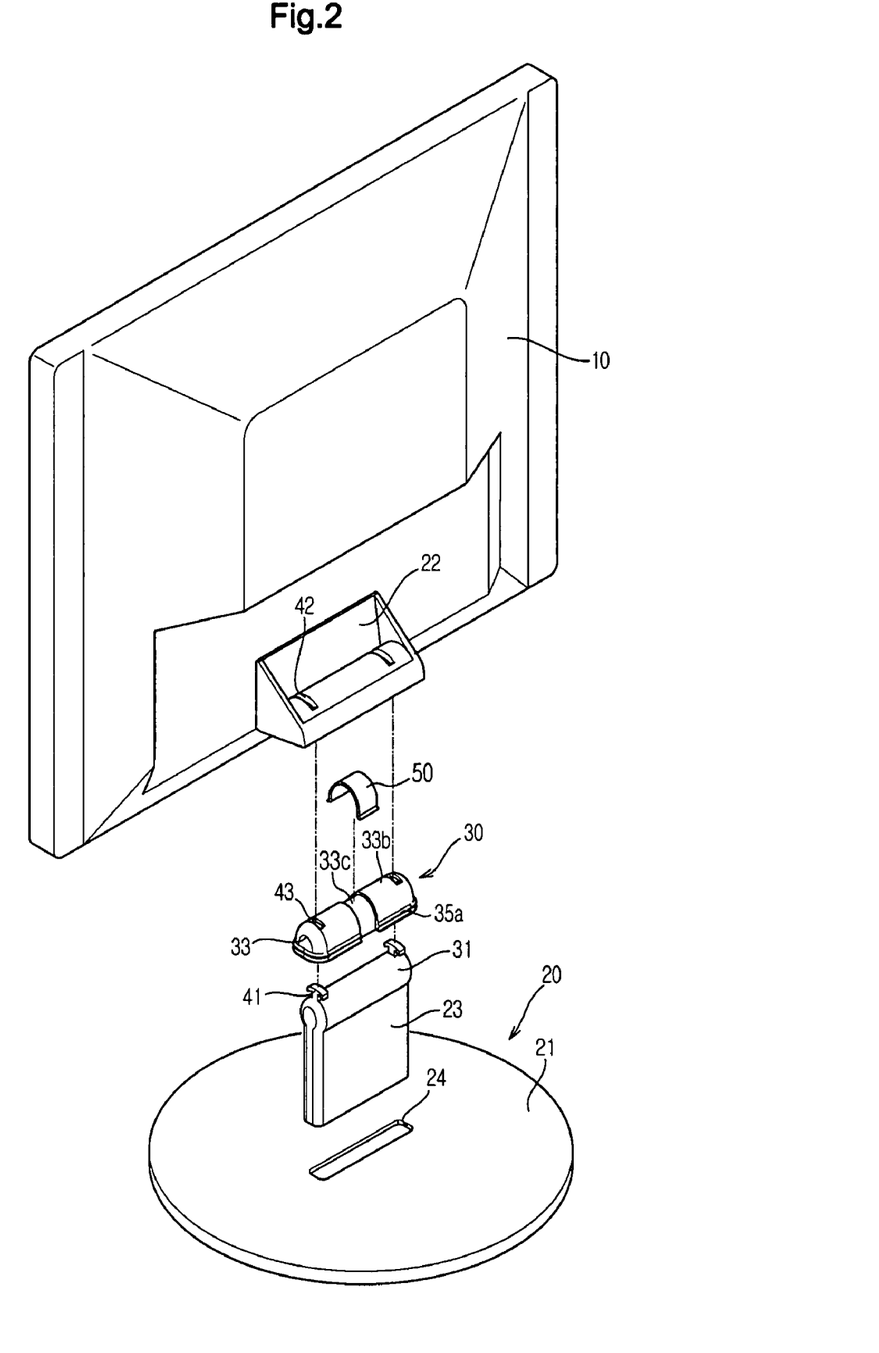
FIG. 2 is an exploded perspective view illustrating a supporting apparatus for display devices in accordance with a first exemplary embodiment of the present invention.

FIGS. 1 through 5 illustrate a display device, particularly, a liquid crystal display (LCD) monitor having a supporting apparatus according to a first exemplary embodiment of the present invention. As illustrated in FIGS. 1 and 2, the display device includes a main body 10 provided with a display screen (not shown), on which an image is displayed, at the front thereof, and a supporting apparatus 20 supporting the main body 10.

The supporting apparatus 20 includes a flat base 21 put on a table such as a desk in order to support the main body 10, a supporting bracket 22 coupled to a rear surface of the main body 10, and a stand 23 coupled to the flat base 21 at a lower portion thereof and to the supporting bracket 22 at an upper portion thereof. Further, the supporting apparatus 20 includes a joint 30, which rotatably connects the upper portion of the stand 23 and the supporting bracket 22 on the rear surface of the main body 10 so as to rotate the main body 10 backwards and forwards to adjust the viewing angle of the display screen of the main body 10.

The supporting bracket 22 on the rear surface of the main body 10 is separately formed, and then coupled to the rear surface of the main body 10 through a fastener such as a screw, or is integrally formed with the main body 10 in the process of forming a case of the main body 10. The stand 23 is fixed to the flat base 21 by screwing or adhering its lower end inserted into a fixing recess 24 of the flat base 21. However, although not illustrated, the stand 23 may be pivotably coupled to the flat base 21 by, for instance, a hinge at the lower end thereof.

Figure 3:
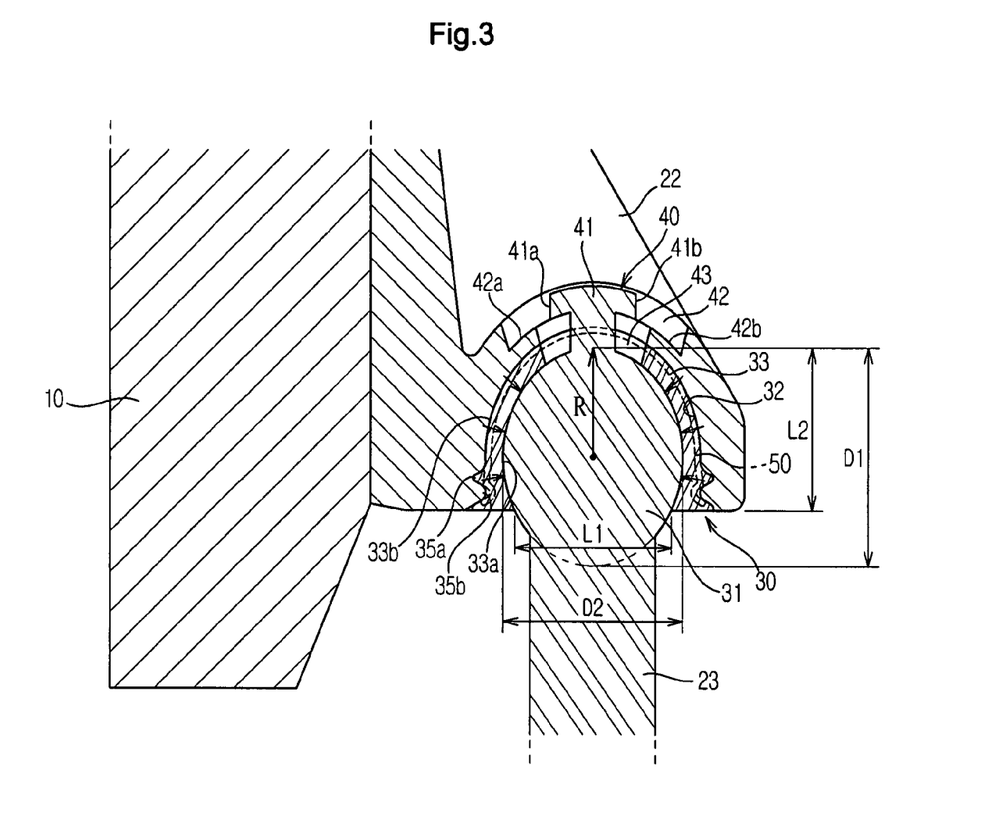
FIG. 3 is a sectional view illustrating an important part of a supporting apparatus for display devices in accordance with a first exemplary embodiment of the present invention, wherein a main body of the display device is in an erect posture.

As illustrated in FIGS. 2 and 3, the joint 30, which connects the upper portion of the stand 23 and the supporting bracket 22, includes a curved plug 31 that is provided at the upper portion of the stand 23, a curved socket 32 that is formed at the supporting bracket 22 so as to be coupled with the curved plug 31, an elastic member 33 that is interposed and connected between the curved plug 31 and the curved socket 32, and a reinforcement spring 50 that is covered on an outer surface of the elastic member 33 so as to reinforce elasticity of the elastic member 33.

The curved plug 31 has the shape of a long cylinder, which is integrally formed with the stand 23. The curved plug 31 is oval in cross section such that the supporting bracket 22 can be coupled to be rotated backwards and forwards. The cross section of the curved plug 31 has a vertical diameter D1 larger than a horizontal diameter D2, as illustrated in FIG. 3.

The cross section of the curved plug 31 may be circular, and preferably oval, in order to maintain stable connection with the supporting bracket 22 and uniform motion when the main body 10 is rotated. This construction will be described in detail below.

The curved socket 32 of the supporting bracket 22 has the shape of a semi-circular dome, which is open downwards so as to allow the curved plug 31 and the elastic member 33 to be fitted thereinto.

The elastic member 33 is semi-circular in cross section, and is formed of elastically deformable material such as rubber, silicon, or soft resin. The elastic member 33 has an inner contact surface 33a corresponding to an outer surface of the curved plug 31, and an outer contact surface 33b corresponding to an inner surface of the curved socket 32, and has the shape of a cap covered above the outer surface of the curved plug 31.

The reinforcement spring 50 is formed by bending a predetermined width of steel sheet in a "C" shape, and is in close contact with the outer contact surface 33b of the elastic member 33. The reinforcement spring 50 presses the elastic member 33 in a radial inward direction, thereby reinforcing elastic force of the elastic member 33. This serves to allow friction to be maintained between the outer surface of the curved plug 31 and the outer contact surface 33b of the elastic member 33 by the elastic member 33, which is pressed in the radial inward direction by the reinforcement spring 50, although the elasticity of the elastic member 33 is varied due to long-term use. As illustrated in FIG. 2, the outer contact surface 33b of the elastic member 33 is provided with a spring fitting recess 33c for fitting the reinforcement spring 50.

When the stand 23 is connected with the supporting bracket 22 using the elastic member 33 and the reinforcement spring 50, the inner contact surface 33a of the elastic member 33 is brought in close contact with the outer surface of the curved plug 31, and the outer contact surface 33b of the elastic member 33 is brought in close contact with the inner surface of the curved socket 32 of the supporting bracket 22. In this case, the curved plug 31 is covered with the elastic member 33 and then the reinforcement spring 50 on the outer surface thereof, and then is fitted into the curved socket 32 of the supporting bracket 22. At this time, the elastic member 33 and the reinforcement spring 50 are deformed while fitted into the curved socket 32. After this connection, the elastic and frictional forces of the elastic member 33 are applied to the outer surface of the curved plug 31 and the inner surface of the curved socket 32, so that the curved plug 31 is not easily separated from the curved socket 32.

The inner contact surface 33a of the elastic member 33 has a horizontal width L1, of its opening, less than the horizontal diameter D2 of the curved plug 31, and has a vertical depth L2 greater than a vertical radius R of the curved plug 31. Hence, after the connection, the curved plug 31 of the stand 23 does not escape from the elastic member 33.

The outer contact surface 33b of the elastic member 33 is provided with a corrugation having a convexity 35a and a concavity 35b, and the inner surface of the curved socket 32 is provided with a corrugation having a concavity corresponding to the convexity 35a and a convexity corresponding to the concavity 35b. Thereby, after the connection, the elastic member 33 is difficult to escape from the curved socket 32.

In this manner, the supporting apparatus of the present invention allows the supporting bracket 22 to be rotatably connected with the upper portion of the stand 23 only by pressure-fitting the curved plug 31 into the curved socket 32 of the supporting bracket 22 via the elastic member 33, so that it can be easier produced over the conventional one. In other words, the supporting apparatus of the present invention can connect the supporting bracket 22 with the stand 23 without a screw or a hinge shaft, so that it can make the production process simpler than the conventional one. Further, the supporting apparatus of the present invention has a construction simpler than the conventional one, so that it can reduce production costs.

The curved plug 31 and the supporting bracket 22 are mounted with a rotation stopper 40, which restricts a rotational range within which the main body 10 rotates backwards and forwards. The rotation stopper 40 includes at least one protrusion 41 that protrudes from the upper portion of the curved plug 31, and at least one slot 42 that is formed at the supporting bracket 22 in a rotating direction of the supporting bracket 22 so as to allow the protrusion 41 to be inserted thereinto. Of course, the elastic member 33 is also provided with at least one slot 43 through which the protrusion 41 passes. The protrusion 41 is provided with first and second catch steps 41a and 41b at opposite ends thereof, and the slot 42 is provided with first and second catch recesses 42a and 42b so as to catch the first and second catch steps 41a and 41b at opposite ends thereof.

Figure 4:
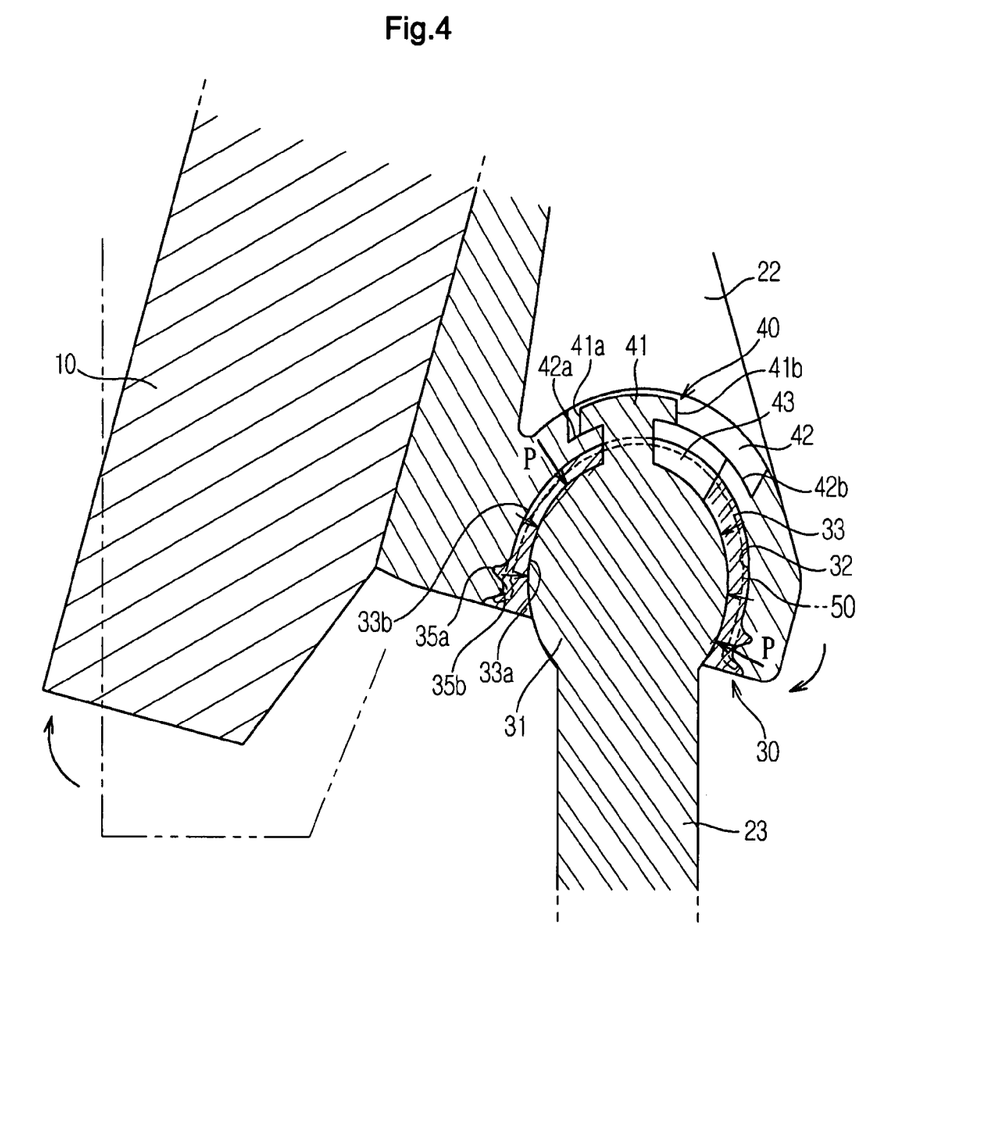
FIG. 4 is a sectional view illustrating an important part of a supporting apparatus for display devices in accordance with a first exemplary embodiment of the present invention, wherein a main body of the display device is rotated backwards.
Figure 5:
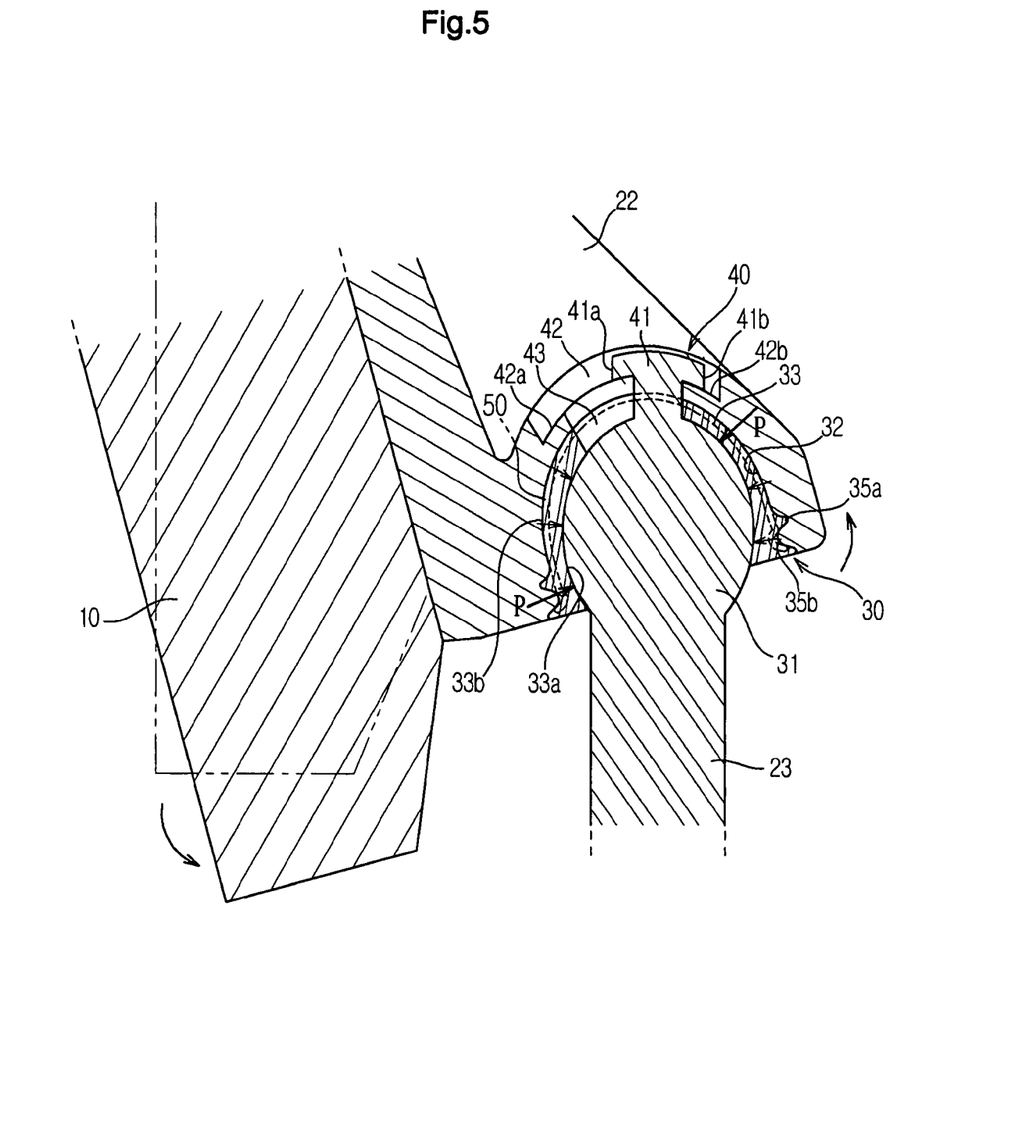
FIG. 5 is a sectional view illustrating an important part of a supporting apparatus for display devices in accordance with a first exemplary embodiment of the present invention, wherein a main body of the display device is rotated forwards.

As illustrated in FIG. 4, the first catch step 41a is caught in the first catch recess 42a when the main body 10 is rotated backwards. As illustrated in FIG. 5, the second catch step 41b is caught in the second catch recess 42b when the main body 10 is rotated forwards. Thus, although the user manipulates the main body 10 with great force in the process of adjusting the viewing angle of the display screen of the main body 10, the curved plug 31 does not escape from the supporting bracket 22.

Now, the operation of the joint 30 during adjusting the viewing angle of the display screen of the main body will be described.

As illustrated in FIG. 3, when the main body 10 is nearly in an erect posture, the elastic force of the elastic member 33 almost uniformly applies to the entire outer surface of the curved plug 31. Hence, the frictional force is uniformly applied between the inner surface of the elastic member 33 and the outer surface of the curved plug 31 on the whole, so that the main body 10 can be maintained in a stop state.

As illustrated in FIG. 4, when the main body 10 is rotated backwards, the center of gravity of the main body 10 moves backwards. Hence, the greater the angle leaning the main body 10 backwards becomes, the greater the rotational moment (the force having tendency to backward rotation) of the main body 10 becomes. In other words, the main body 10 shows a tendency toward easy rotation as it is leaning backwards. However, because the cross section of the curved plug 31 is oval, the repulsive force P of the elastic member 33 acting on each of the rear lower and front upper portions of the curved plug 31 is increased. As the rotational moment is increased, the repulsive force P is increased, and thus acts as rotational resistance. In other words, the rotational moment is in direct proportion to the rotational resistance. Thus, when the main body 10 is rotated backwards, the rotational moment is applied in a direction opposite to the rotational resistance, so that the rotational force is constantly maintained. Thus, while the main body 10 is rotated, the motion of the main body 10 can be uniformly maintained regardless of the change in slope.

As illustrated in FIG. 5, this construction is equally applied to the case where the main body 10 is rotated forwards. At this time, because the center of gravity of the main body 10 moves forwards, the force having a tendency to forward rotation is increased. However, the repulsive force P of the elastic member 33 acting on each of the rear upper and front lower portions of the curved plug 31 is increased, and acts as rotational resistance, so that the rotational force is uniformly maintained. Therefore, the motion of the main body 10 is uniformly maintained while the main body 10 is rotated.

Figure 6:
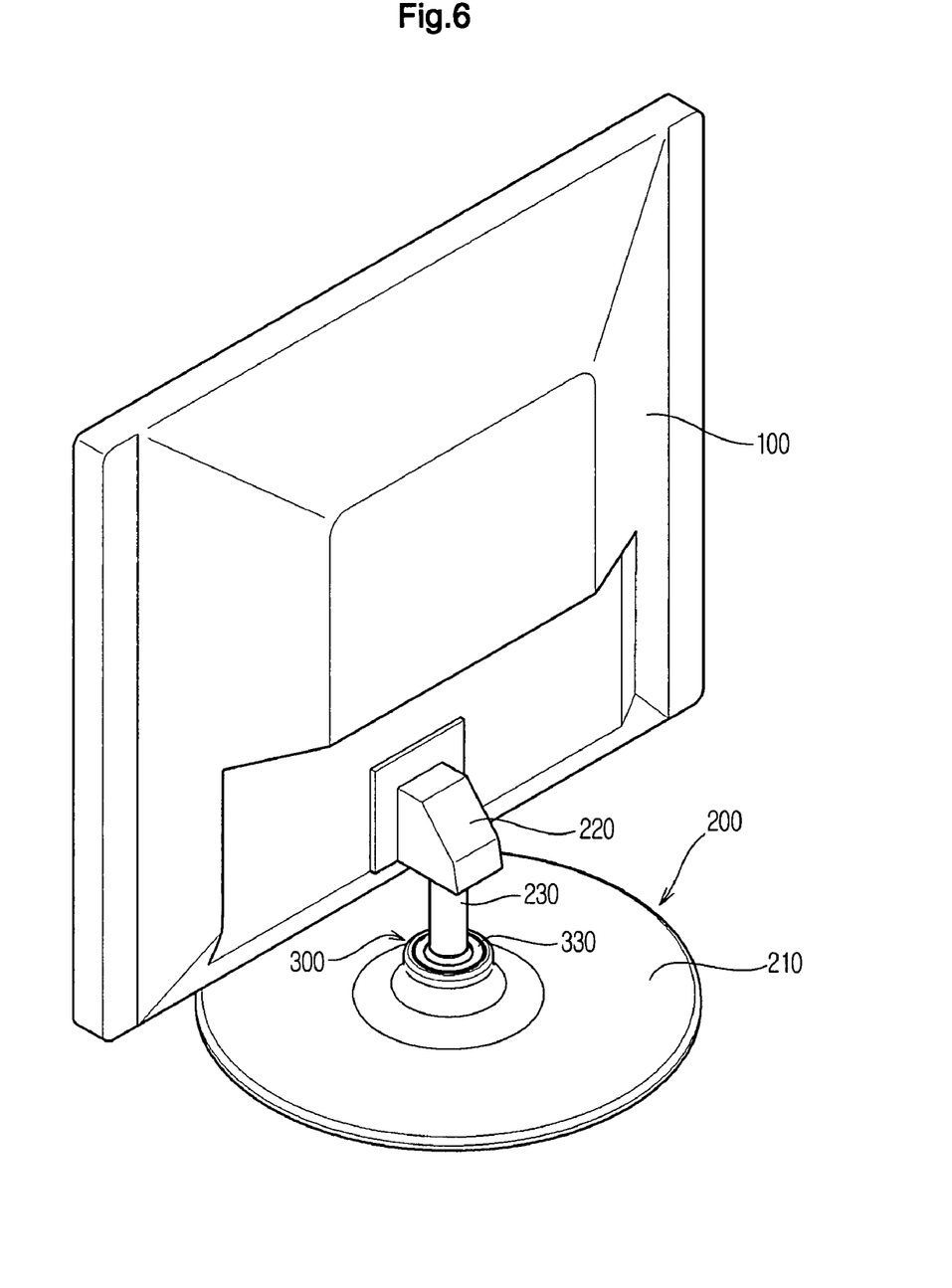
FIG. 6 is a perspective view illustrating a display device according to a second exemplary embodiment of the present invention.
Figure 7:
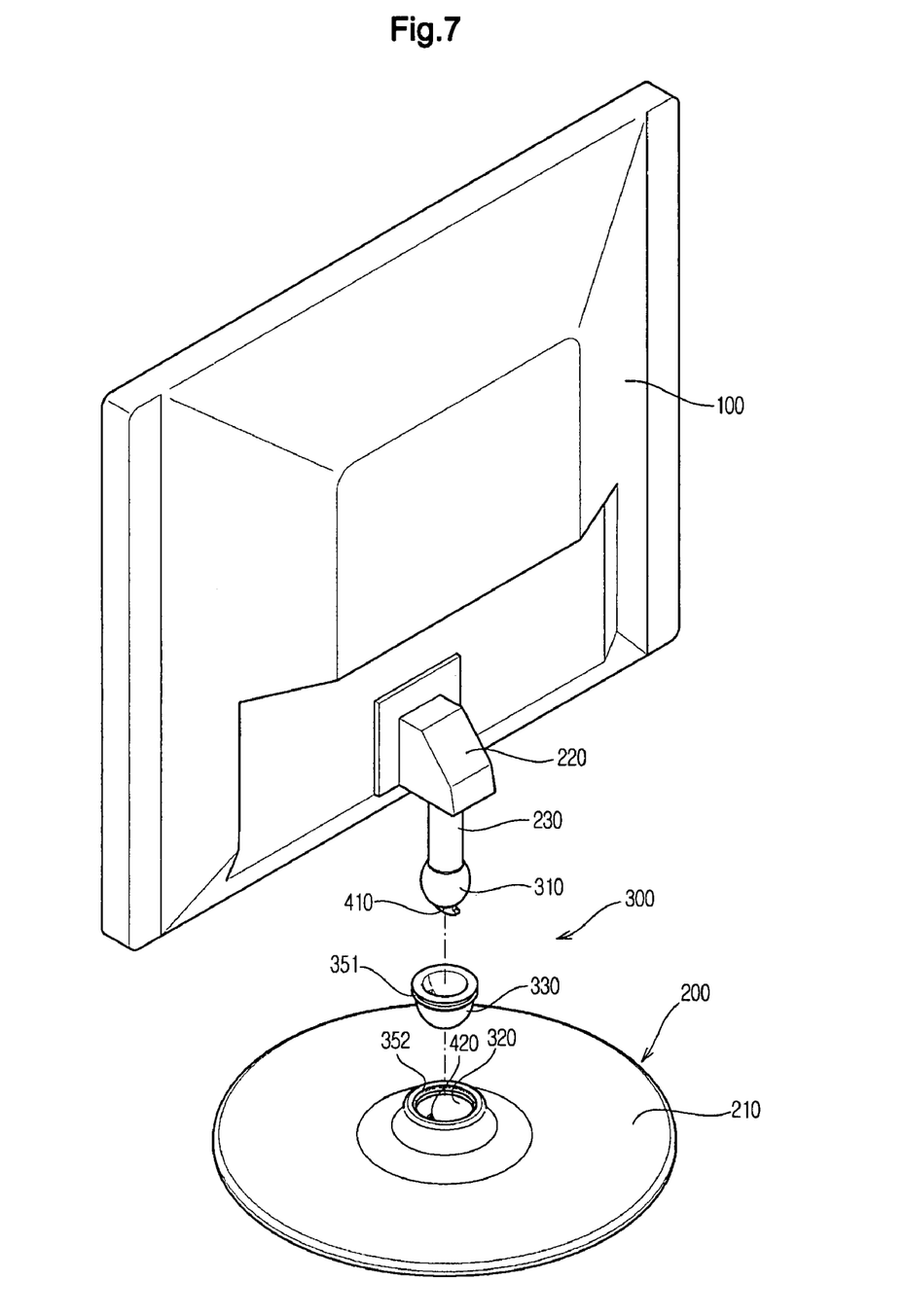
FIG. 7 is an exploded perspective view illustrating a supporting apparatus for display devices in accordance with a second exemplary embodiment of the present invention.

FIGS. 6 through 11 illustrate a display device, particularly, a liquid crystal display (LCD) monitor having a supporting apparatus according to a second exemplary embodiment of the present invention. As illustrated in FIGS. 6 and 7, the display device includes a main body 100 provided with a display screen (not shown), on which an image is displayed, at the front thereof, and a supporting apparatus 200 supporting the main body 100.

The supporting apparatus 200 includes a flat base 210 put on a table such as a desk in order to support the main body 100, a supporting bracket 220 coupled to a rear surface of the main body 100, and a stand 230 coupled to the flat base 210 at a lower portion thereof and to the supporting bracket 220 at an upper portion thereof. Further, the supporting apparatus 200 includes a joint 300, which rotatably connects the lower portion of the stand 230 and the flat base 210 so as to rotate the main body 100 backwards and forwards to adjust a viewing angle of the display screen of the main body 100.

FIG. 7 illustrates an example in which the upper portion of the stand 230 is fixed to the supporting bracket 220 of the rear surface of the main body 100. However, the present invention is not limited to this example. Thus, the stand 230 may be directly fixed to the main body 100 at the upper portion thereof, or be integrally formed with a case of the main body 100.

Figure 8:
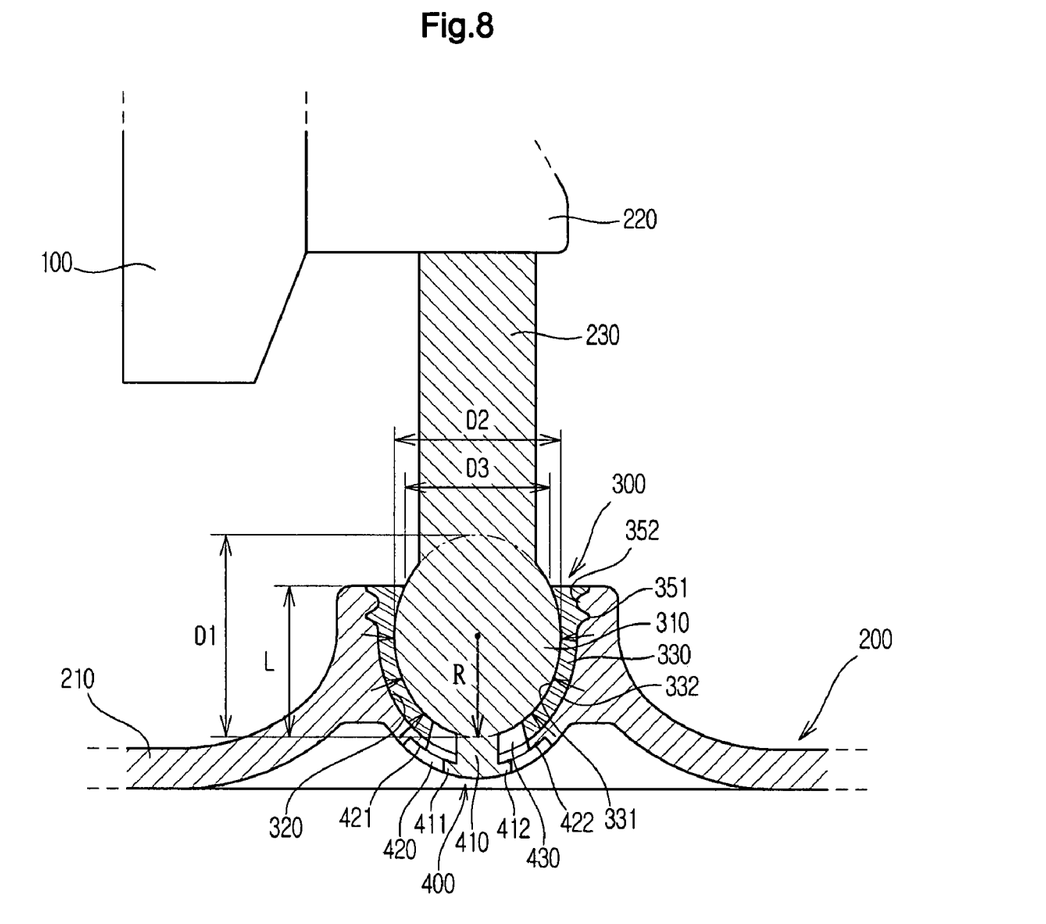
FIG. 8 is a sectional view illustrating an important part of a supporting apparatus for display devices in accordance with a second exemplary embodiment of the present invention, wherein a main body of the display device is in an erect posture.

As illustrated in FIGS. 7 and 8, the joint 300, which connects the lower portion of the stand 230 and the flat base 210, includes a curved plug 310 that is provided at the lower portion of the stand 230, a curved socket 320 that is formed at the flat base 210 so as to be coupled with the curved plug 310, and an elastic member 330 that is interposed and connected between the curved plug 310 and the curved socket 320.

The curved plug 310 is integrally formed with the stand 230, and has the shape of a sphere so as to be rotatably coupled to the flat base 210. The curved plug 310 is oval in cross section, thus having a vertical diameter D1 larger than a horizontal diameter D2, as illustrated in FIG. 8.

The cross section of the curved plug 310 may be circular, and preferably oval, in order to maintain stable connection with the flat base 210 and uniform motion when the main body 100 is rotated backwards and forwards. This construction will be described in detail below.

The curved socket 320 of the flat base 210 has the shape of a semi-circular cup hemisphere, which is open upwards so as to allow the curved plug 310 and the elastic member 330 to be fitted thereinto.

The elastic member 330 is semi-circular in cross section, and is formed of elastically deformable material such as rubber, silicon, or soft resin. The elastic member 330 has an inner contact surface 331 corresponding to an outer surface of the curved plug 310, and an outer contact surface 332 corresponding to an inner surface of the curved socket 320, and has the shape of a cap covered above the outer surface of the curved plug 310.

When the stand 230 is connected with the flat base 210 using the elastic member 330, the inner contact surface 331 of the elastic member 330 is brought in close contact with the outer surface of the curved plug 310, and the outer contact surface 332 of the elastic member 330 is brought in close contact with the inner surface of the curved socket 320 of the flat base 210. In this case, the curved plug 310 is covered with the elastic member 330 on the outer surface thereof, and then is fitted into the curved socket 320 of the flat base 210. At this time, the elastic member 330 is deformed while fitted into the curved socket 320. After this connection, the elastic and frictional forces of the elastic member 330 are applied to the outer surface of the curved plug 310 and the inner surface of the curved socket 320, so that the curved plug 310 is not easily separated from the curved socket 320.

The inner contact surface 331 of the elastic member 330 has a horizontal width D3, of its opening, less than the horizontal diameter D2 of the curved plug 310, and has a vertical depth L greater than a vertical radius R of the curved plug 310. Hence, after the connection, the curved plug 310 of the stand 230 does not escape from the elastic member 330.

The outer contact surface 332 of the elastic member 330 is provided with a corrugation having a convexity 351 and a concavity 352, and the inner surface of the curved socket 320 is provided with a corrugation having a concavity corresponding to the convexity 351 and a convexity corresponding to the concavity 352. Thereby, after the connection, the elastic member 330 is difficult to escape from the curved socket 320.

In this manner, the supporting apparatus of the present invention allows the flat base 210 to be rotatably connected with the lower portion of the stand 230 only by pressure-fitting the curved plug 310 into the curved socket 320 of the flat base 210 via the elastic member 330, so that it can be easier produced over the conventional one. In other words, the supporting apparatus of the present invention can connect the flat base 210 with the stand 230 without a screw or a hinge shaft, so that it can make the production process simpler than the conventional one. Further, the supporting apparatus of the present invention has a construction simpler than the conventional one, so that it can reduce production costs.

As illustrated in FIG. 8, the curved plug 310 and the supporting bracket 220 are mounted with a rotation stopper 400, which restricts a rotational range within which the main body 100 rotates backwards and forwards. The rotation stopper 400 includes a protrusion 410 that protrudes from the lower portion of the curved plug 310, and a slot 420 that is formed at the base 210 in a rotating direction of the curved plug 310 so as to allow the protrusion 410 to be inserted thereinto. Of course, the elastic member 330 is also provided with a slot 430 through which the protrusion 410 passes. The protrusion 410 is provided with first and second catch steps 411 and 412 at opposite ends thereof, and the slot 420 is provided with first and second catch recesses 421 and 422 so as to catch the first and second catch steps 411 and 412 at opposite ends thereof.

Figure 9:
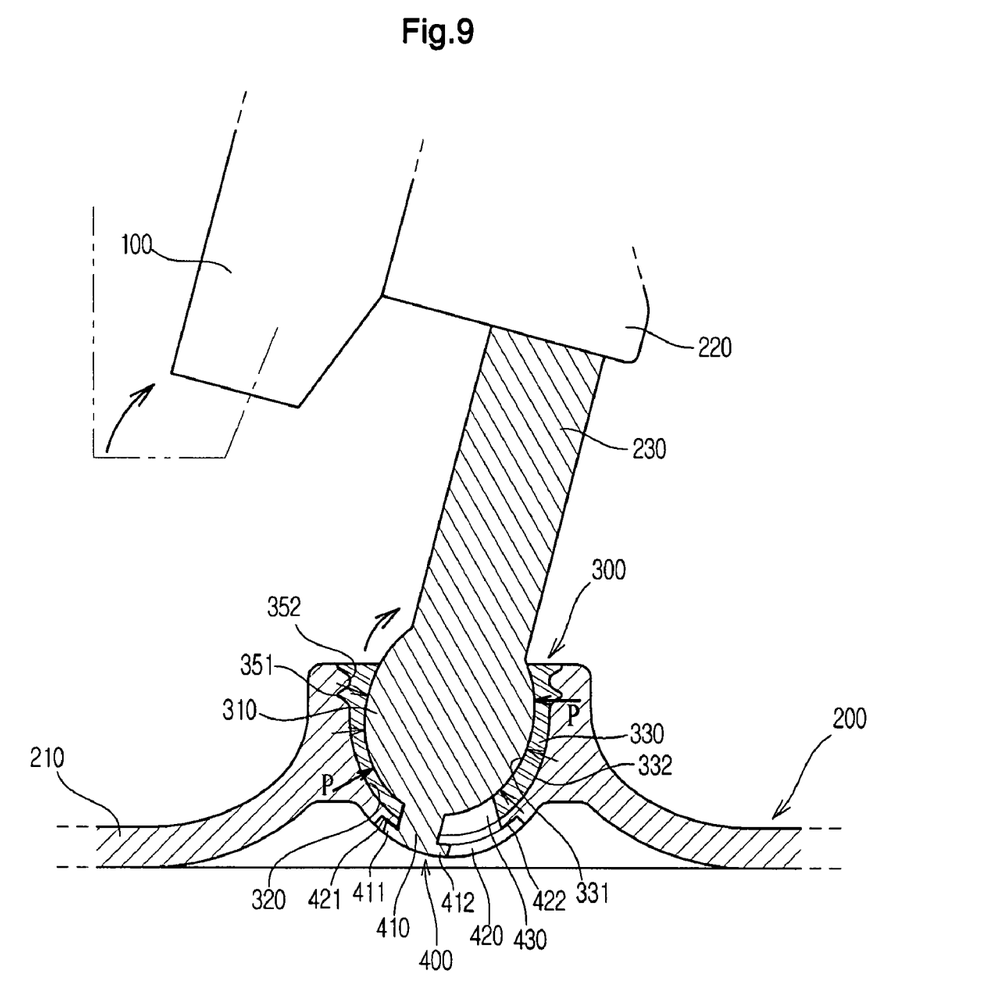
FIG. 9 is a sectional view illustrating an important part of a supporting apparatus for display devices in accordance with a second exemplary embodiment of the present invention, wherein a main body of the display device is rotated backwards.
Figure 10:
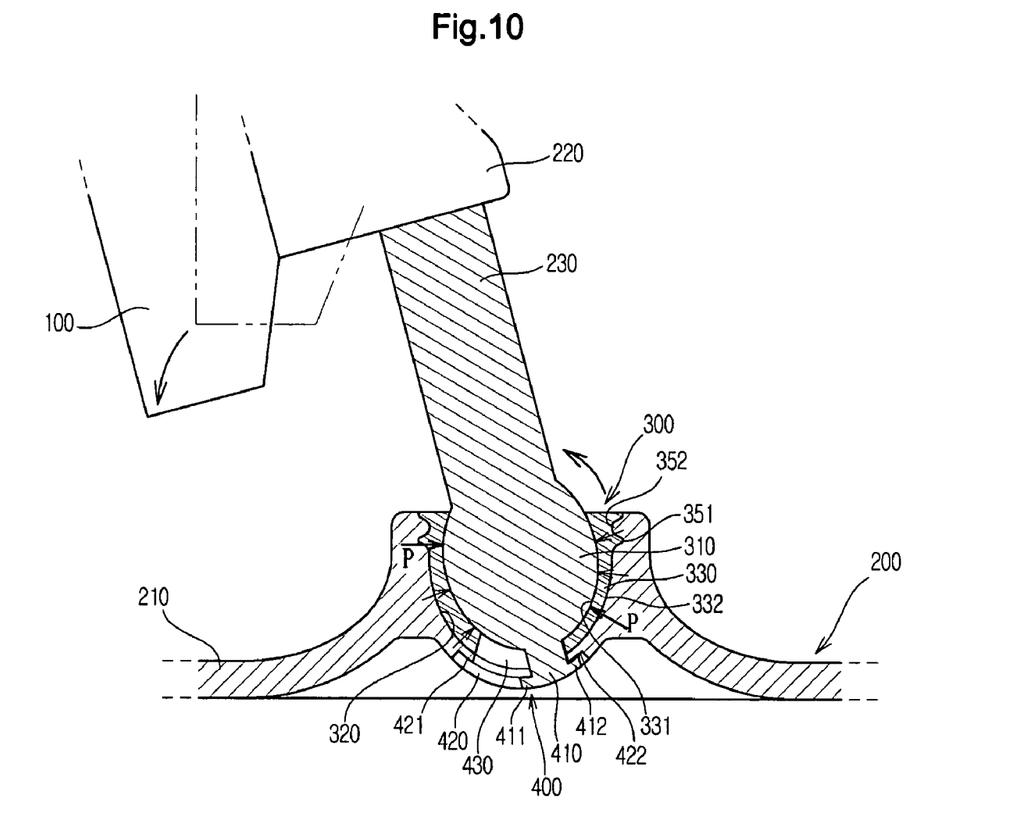
FIG. 10 is a sectional view illustrating an important part of a supporting apparatus for display devices in accordance with a second exemplary embodiment of the present invention, wherein a main body of the display device is rotated forwards.

As illustrated in FIG. 9, the first catch step 411 is caught in the first catch recess 421 when the main body 100 is rotated backwards. As illustrated in FIG. 10, the second catch step 412 is caught in the second catch recess 422 when the main body 100 is rotated forwards. Thus, although the user manipulates the main body 100 with great force in the process of adjusting the viewing angle of the display screen of the main body 100, the curved plug 310 does not escape from the flat base 210.

Figure 11:
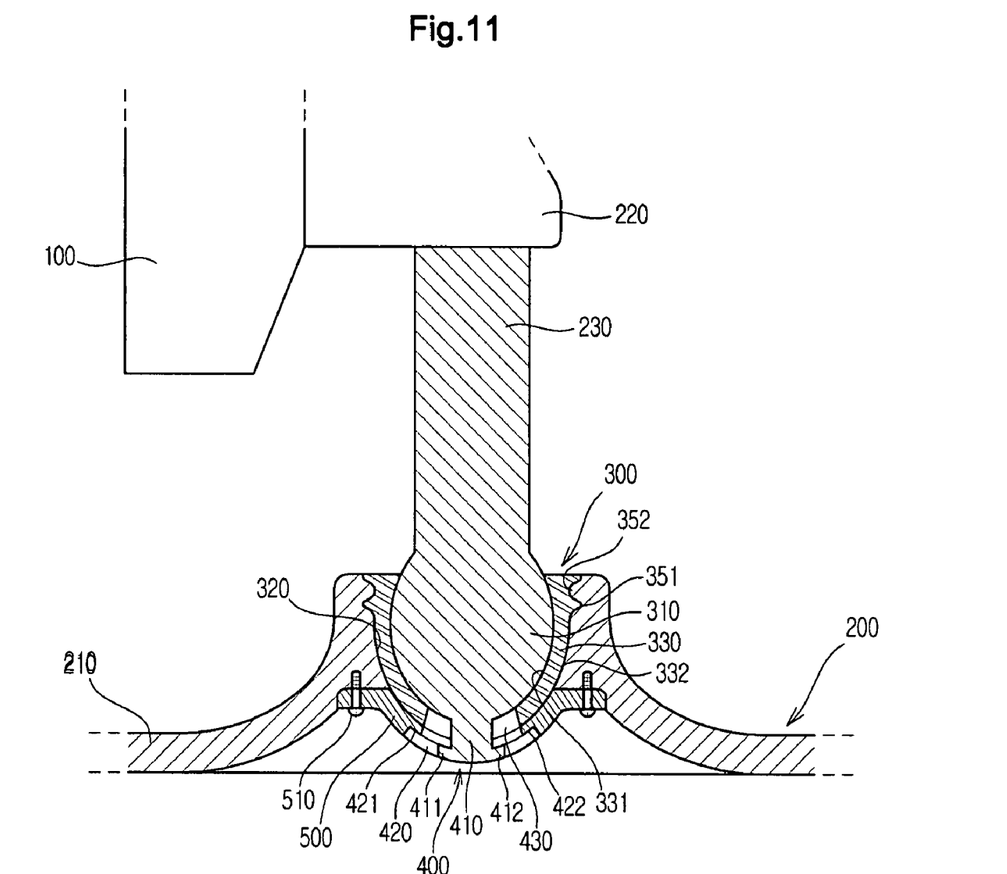
FIG. 11 is a sectional view illustrating an important part of a supporting apparatus for display devices in accordance with a second exemplary embodiment of the present invention, wherein the lower portion of a curved socket of the supporting apparatus is opened and closed by a lower cover.

FIG. 11 illustrates a modification of the joint 300. In FIG. 11, the lower portion of the curved socket 320 of the flat base 210 is provided with an opening, to which a lower cover 500 is coupled. The lower cover 500 is fixed to the lower portion of the flat base 210 by screws 510. Here, the recess 420 of the rotation stopper 400 is allotted to the lower cover 500. Thereby, the lower portion of the curved socket 320 is allowed to be opened or closed by the lower cover 500, so that the curved plug 310 of the stand 230 can be easier coupled to the curved socket 320 of the flat base 210.

Now, the operation of the joint 300 during adjusting the viewing angle of the display screen of the main body will be described.

As illustrated in FIG. 8, when the main body 100 is nearly in an erect posture, the elastic force of the elastic member 330 almost uniformly applies to the entire outer surface of the curved plug 310. Hence, the frictional force is uniformly applied between the inner surface of the elastic member 330 and the outer surface of the curved plug 310 on the whole, so that the main body 100 can be maintained in a stop state.

As illustrated in FIG. 9, when the main body 100 is rotated backwards, the center of gravity of the main body 100 moves backwards. Hence, the greater the angle leaning the main body 100 backwards becomes, the greater the rotational moment (the force having a tendency towards backward rotation) of the main body 100 becomes. In other words, the main body 100 shows a tendency toward easy rotation as it is leaning backwards. However, because the cross section of the curved plug 31 is oval, the repulsive force P of the elastic member 330 acting on each of the rear upper and front lower portions of the curved plug 310 is increased. As the rotational moment is increased, the repulsive force P is increased, and thus acts as rotational resistance. In other words, the rotational moment is in direct proportion to the rotational resistance. Thus, when the main body 100 is rotated backwards, the rotational moment is applied in a direction opposite to the rotational resistance, so that the rotational force is constantly maintained. Thus, while the main body 100 is rotated, the motion of the main body 100 can be uniformly maintained regardless of the change in slope.

As illustrated in FIG. 10, this construction is equally applied to the case where the main body 100 is rotated forwards. At this time, because the center of gravity of the main body 100 moves forwards, the force having tendency to forward rotation is increased. However, the repulsive force P of the elastic member 330 acting on each of the rear upper and front lower portions of the curved plug 310 is increased, and acts as rotational resistance, so that the rotational force is uniformly maintained. Therefore, the motion of the main body 100 is uniformly maintained while the main body 100 is rotated.

As described in detail above, the supporting apparatus for display devices in accordance with the first exemplary embodiment of the present invention allows the supporting bracket to be rotatably connected with the stand only by pressure-fitting the curved plug into the curved socket of the supporting bracket via the elastic member, so that it can simplify the production process and thus be easier produced compared to the conventional one. Further, the supporting apparatus of the present invention has a construction simpler than the conventional one, so that it can reduce production costs.

Further, in the supporting apparatus for display devices in accordance with the first exemplary embodiment of the present invention, because the curved plug of the stand is oval, the rotational moment is applied in a direction opposite to the rotational resistance when rotating the main body backwards and forwards to adjust a viewing angle of the display screen of the main body, so that the rotational force is constantly maintained regardless of the change in the slope of the main body. Therefore, while the main body is rotated, the motion of the main body can be uniformly maintained.

In addition, in the supporting apparatus for display devices in accordance with the first exemplary embodiment of the present invention, because the reinforcement spring coupled on the outer surface of the elastic member presses the elastic member to be contracted, the friction between the outer surface of the curved plug and the inner contact surface of the elastic member can be maintained although the elastic member is varied in elasticity due to long-term use.

Further, the supporting apparatus for display devices in accordance with the second exemplary embodiment of the present invention allows the flat base to be rotatably connected with the stand only by pressure-fitting the curved plug of the stand into the curved socket of the flat base via the elastic member, so that it can simplify the production process and thus be produced easier than the conventional one.

Further, in the supporting apparatus for display devices in accordance with the second exemplary embodiment of the present invention, because the curved plug of the stand is oval, the rotational moment is applied in a direction opposite to the rotational resistance when rotating the main body backwards and forwards to adjust a viewing angle of the display screen of the main body, so that the rotational force is constantly maintained regardless of the change in the slope of the main body. Therefore, while the main body is rotated, the motion of the main body can be uniformly maintained.

In addition, in the supporting apparatus for display devices in accordance with the second exemplary embodiment of the present invention, because the rotational range of the main body is restricted by the rotation stopper, it is possible to prevent the main body from excessively rotating when adjusting the viewing angle of the display screen of the main body.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A display device, comprising:
a main body having a display screen; and
a supporting apparatus to support the main body,
wherein the supporting apparatus includes a supporting bracket provided to the main body, a base supporting the main body, a stand coupled to the base at a lower portion thereof and to the supporting bracket at an upper portion thereof, and a joint to rotatably connect the upper portion of the stand and the supporting bracket,
wherein the joint includes a curved plug that is provided at the upper portion of the stand and has a curved outer surface, a curved socket that is formed at the supporting bracket so as to be coupled with the curved plug, and an elastic member that is interposed and connected between the curved plug and the curved socket; and
wherein the elastic member has the shape of a cap, and includes an inner contact surface corresponding to the outer surface of the curved plug, and an outer contact surface corresponding to an inner surface of the curved socket.

2. The display device as claimed in claim 1, wherein the curved plug is oval and has a vertical diameter greater than a horizontal diameter.

3. The display device as claimed in claim 1, wherein the curved plug is cylindrical and is integrally formed with the stand.

4. The display device as claimed in claim 1, wherein the curved plug is oval and has a vertical diameter greater than a horizontal diameter.

5. The display device as claimed in claim 4, wherein the inner contact surface of the elastic member has a horizontal width, of its opening, less than the horizontal diameter of the curved plug, and has a vertical depth greater than a vertical radius of the curved plug.

6. The display device as claimed in claim 4, wherein the outer surface of the elastic member and the inner surface of the curved socket are each provided with a corrugation having a convexity and a concavity.

7. The display device as claimed in claim 3, further comprising a rotation stopper provided to the curved plug and the supporting bracket so as to restrict a rotational range within which the main body rotates backwards and forwards.

8. The display device as claimed in claim 7, wherein the rotation stopper includes at least one protrusion that protrudes from the upper portion of the curved plug, and at least one slot that is formed at the supporting bracket in a rotating direction of the supporting bracket so as to allow the protrusion to be inserted thereinto.

9. The display device as claimed in claim 8, wherein: the protrusion is provided with first and second catch steps at opposite ends thereof; and the slot is provided with first and second catch recesses so as to catch the first and second catch steps at opposite ends thereof.

10. The display device as claimed in claim 1, wherein the lower portion of the stand is fixed to the base.

11. A display device, comprising:
a main body having a display screen;
a supporting apparatus to support the main body,
wherein the supporting apparatus includes a supporting bracket provided to the main body, a base supporting the main body, a stand coupled to the base at a lower portion thereof and to the supporting bracket at an upper portion thereof, and a joint to rotatably connect the upper portion of the stand and the supporting bracket, and
wherein the joint includes a curved plug that is provided at the upper portion of the stand and has a curved outer surface, a curved socket that is formed at the supporting bracket so as to be coupled with the curved plug, and an elastic member that is interposed and connected between the curved plug and the curved socket; and
a reinforcement spring that is covered on an outer surface of the elastic member so as to reinforce elasticity of the elastic member.

12. The display device as claimed in claim 11, wherein: the reinforcement spring has a "C" shaped spring pressing the outer surface of the elastic member in close contact with the outer surface of the elastic member; and the elastic member is provided with a spring fitting recess for fitting the reinforcement spring on the outer contact surface thereof.

* * * * *